United States Patent
Baldwin et al.

(10) Patent No.: US 7,547,457 B2
(45) Date of Patent: Jun. 16, 2009

(54) METHODS OF FORTIFYING PROCESS CHEESE AND PRODUCTS THEREOF

(75) Inventors: Cheryl J. Baldwin, Mundelein, IL (US);
Gary F. Smith, Glenview, IL (US);
Ahmad Akashe, Mundelein, IL (US)

(73) Assignee: Kraft Foods Global Brands LLC, Northfield, IL (US)

( * ) Notice: Subject to any disclaimer, the term of this patent is extended or adjusted under 35 U.S.C. 154(b) by 436 days.

(21) Appl. No.: 11/461,477

(22) Filed: Aug. 1, 2006

(65) Prior Publication Data

US 2008/0032003 A1 Feb. 7, 2008

(51) Int. Cl.
*A23L 1/304* (2006.01)
*A23C 19/08* (2006.01)

(52) U.S. Cl. .................. 426/74; 426/519; 426/520; 426/582

(58) Field of Classification Search ............ 426/72, 426/73, 74, 519, 520, 582
See application file for complete search history.

(56) References Cited

U.S. PATENT DOCUMENTS

| | | | |
|---|---|---|---|
| 4,243,691 A | 1/1981 | Mohlenkamp, Jr. et al. | |
| 4,471,002 A | 9/1984 | Buckholz, Jr. et al. | |
| 4,473,595 A | 9/1984 | Rood et al. | |
| 4,931,305 A | 6/1990 | Karppanen et al. | |
| 4,963,387 A | 10/1990 | Nakagawa et al. | |
| 6,039,978 A | 3/2000 | Bangs et al. | |
| 6,090,417 A | 7/2000 | Mehnert et al. | |
| 6,326,038 B1 | 12/2001 | Brafford et al. | |
| 6,426,102 B1 | 7/2002 | Isom et al. | |
| 6,541,050 B1 | 4/2003 | Bonorden et al. | |
| 2003/0021873 A1 | 1/2003 | Willits et al. | |
| 2003/0165597 A1 | 9/2003 | Augustin et al. | |
| 2004/0224076 A1 | 11/2004 | Derrien et al. | |

FOREIGN PATENT DOCUMENTS

EP 0190521 8/1988

*Primary Examiner*—Helen F Pratt
(74) *Attorney, Agent, or Firm*—Fitch, Even, Tabin & Flannery

(57) ABSTRACT

Methods are provided for making nutrient fortified foods, and particularly methods of fortifying process cheeses with magnesium and the resulting magnesium-fortified process cheese products. These methods allow significant amounts of nutrient supplements, such as minerals and/or vitamins, to be delivered per serving of food product without adversely affecting functionality or product quality. These magnesium-fortified process cheeses also may be produced with increased salty flavor without increased sodium content, or maintain salty flavor at reduced sodium content, without need for potassium salt substitutes. Foods fortified by the disclosed methods retain their desired functionality and sensory properties such as textures, mouthfeel, flavor, and the like.

31 Claims, 2 Drawing Sheets

METHODS OF FORTIFYING PROCESS CHEESE AND PRODUCTS THEREOF

FIELD OF THE INVENTION

The invention relates to methods of making nutrient fortified foods, and particularly to methods of fortifying process cheeses with magnesium and the resulting magnesium-fortified process cheese products.

BACKGROUND OF THE INVENTION

Food products produced for public consumption are often enhanced by adding nutritional or other types of supplements in order to improve their nutritional properties, commonly called fortification. Fortification is typically done with nutrients that are not adequately consumed in the diet. Thus, the fortified food provides an additional source of the needed nutrient, and improves the nutritional quality of the consumer's diet.

Magnesium is an essential nutrient. Among other things, it is a key bone health nutrient; approximately 60% of magnesium is stored in bone. However, large human population segments do not consume the recommended levels of magnesium in their diet. As a result, fortification of foods with magnesium is desirable. However, fortification with minerals like magnesium is often problematic in the food due to its high level of reactivity in foods. Challenges with magnesium fortification can include color, flavor, and texture changes and processing issues.

In general, nutrient fortification of foods is often achieved by blending the desired nutrient into the food product while it is being produced. There are many examples of fortification in the food supply. A common example is the fortification of milk with vitamin A, which is typically blended into the milk during processing. Other examples include the fortification of milk with calcium phosphates as disclosed in U.S. Patent Appln. Publication No. 2003/0165597, or the fortification of unripened dairy products such as skim milk and yogurt with combinations of dicalcium phosphate and magnesium phosphate as disclosed in U.S. Pat. No. 6,039,978, or drinkable yogurts as described in Food Product Design, "Pumped-Up Dairy", October 2003.

Process cheese is made by heating natural cheese with emulsifiers. The emulsifiers solubilize the proteins so they do not precipitate as a result of the heat treatment. The emulsification of the dairy proteins is a sensitive balance of ion association with the protein. With magnesium fortification, one would expect that the magnesium would be added with the cheese and other ingredients and the mixture heated. However, when minerals like magnesium are added to process cheese for fortification, they can disrupt the ionic balance and often cause emulsification issues including texture defects like softening or curdling/separation. Further, process cheese contains other components that may react with the minerals over shelf life. For example, mineral-phosphate crystals can form over shelf life.

The prior art suggests means to overcome these issues. For example, divalent mineral fortification of milk was assisted by phosphates in the U.S. Patent Application Publication No. 2003/0165597. They were able to add soluble forms of calcium into the beverage prior to the addition of phosphates and keep the pH between 6.5 and 7.5. This was shown to not be feasible for magnesium in process cheese since the ionic exchange is more complex and requires a lower pH for stability.

As generally disclosed in U.S. Pat. Nos. 6,090,417, 6,326,038, and 6,426,102 B1, it is also known to fortify a cheese with certain vitamins or other nutritional supplements by first shredding the cheese to accept the fortification followed by a blending (e.g., tumbling) of the cheese shreds and fortifying additives, and then compressing (without melting) the coated cheese shreds back into a homogenous mass. U.S. Patent Application Publication No. 2003/0021873 also discloses a similar method of fortifying a shredded cheese with a calcium anti-caking agent.

Fortification methods that shred and recombine cheese have the shortcoming that significant additional processing steps are required for the cheese to receive the coating (i.e., shredding and blending), and to finish the product (i.e., compressing into a final form). The additional processing steps increase manufacturing complexity and costs. Also, coating particles tend to loosen and flake or dust off from the cheese shreds as coated by the prior methods, creating visible detritus in the food packages and/or interfere with package sealing operations. Also, some vitamins and minerals may adversely impact functionality and/or organoleptic properties of foods, and/or may be counter-productive to improving the beneficial health effects to foods if introduced in excessively large amounts relative to the food mass.

In addition to nutrient content, flavor is key to consumer acceptance of process cheese, and salty flavor has proven to drive some of that flavor and acceptability. Conventional process cheeses have relied upon sodium salts to impart saltiness, namely sodium chloride. However, sodium salt use has its limits due to nutritional and health concerns. To reduce sodium content of foods, potassium salts have been used as sodium salt substitutes. However, potassium salts have their drawbacks, as they tend to impart bitter flavors to the salted foods. To overcome the drawbacks of potassium salts, other additives are commonly used in conjunction with such potassium salts. Magnesium is among the options that can be used. Magnesium phosphates have been described as useful to mask the bitterness of potassium and chloride salts. Magnesium citrate may aid in flavor delivery. And magnesium can be included since it has important health functions. U.S. Pat. No. 4,471,002 describes a seasoning mix that can be used to flavor foods with cheddar cheese flavors. Magnesium salts are included in the mixture, magnesium phosphate being an option. The composition requires lactate, glycollate, magnesium, phosphate, sodium, potassium, chloride, carbonate, glutamate, and calcium. EP0 Patent No. 190521B1 describes the use of sea salt to make a low-sodium natural cheese, by using during salting for driving out water from the curd. Sea salt contains magnesium chloride, sodium chloride, potassium chloride, magnesium sulfate and magnesium oxide. U.S. Patent Appln. Publication No. 2004/0224076A1 describes a salt substitute composition that includes potassium chloride, sodium chloride, calcium salt, and magnesium. Magnesium was included to deliver magnesium to the diet for health benefits, while magnesium citrate was used as a flavor-enhancing agent, and magnesium carbonate for anti-agglomerating effects. Magnesium phosphate is discussed as a form of magnesium that can be used. U.S. Pat. No. 4,473,595 describes a salt substitute composition of sodium chloride, potassium chloride, magnesium sulfate or magnesium chloride. This composition was found to have high saltiness and low bitterness—magnesium sulfate serving as a bitterness masking agent. U.S. Pat. No. 4,243,691 describes a salt substitute containing nucleotides, amino acids, sugar, potassium phosphate, potassium chloride. Potassium phosphate used to mask the bitterness of sodium chloride and has some mouthwatering and astringency to it. U.S. Pat. No. 6,541, 050B1 describes a salt enhancing composition with potassium chloride as the main ingredient and a sulfate salt used to mask the off-notes of the potassium chloride. U.S. Pat. No. 4,931,305 describes using a composition of magnesium sulfate, potassium chloride, sodium chloride and acidic amino acids as a salt substitute. The magnesium component required it be soluble and it was proposed that acidic components increase salty impact. U.S. Pat. No. 4,963,387 describes a salt substitute comprising whey minerals used with alkali metal salts (potassium and sodium). Optionally, the addition of calcium and magnesium salts can be included.

Prior to the present invention, a need has existed for methods that introduce nutritional supplements, particularly magnesium supplements, into process cheese products while providing cheeses that retain their flavor, texture, mouthfeel, and shelf stability. There further remains a need to provide process cheese products fortified with any of a broad range of nutritional supplements. The present invention fulfils these and other needs.

SUMMARY OF THE INVENTION

The invention provides methods of fortifying process cheese to allow significant amounts of minerals and other nutrient supplements, especially magnesium, to be delivered per serving of food product without adversely affecting functionality or product quality. Processed cheeses fortified by the disclosed methods retain their desired textures, mouthfeel, flavor, and other organoleptic properties, and shelf life.

This invention also allows for introduction of nutritionally significant amounts of magnesium in process cheese products with flavor enhancement properties, namely, with increased salty flavor. The added salty flavor from the magnesium addition, allows for further improvements in the nutritional quality of the product by effectively reducing the total amount of sodium needed in the product for flavor reasons. This salt enhancement is possible even without a potassium salt. Nutritionally significant amounts of magnesium are delivered while the overall sodium content of product can be reduced or overall flavor of the product improved.

In one embodiment of the present invention, a mineral nutrient such as magnesium is introduced to process cheese products during their manufacture without impairing processability, functionality or product quality. In a particular embodiment, there is a method of making a nutritionally-fortified process cheese product, comprising combining magnesium phosphate with a cheese blend including an emulsifying agent to provide a cheese mixture. The cheese mixture is heated and mixed effective to provide a substantially homogenous intermediate cheese material. The intermediate cheese material is formed into process cheese product comprising one or more process cheese units. Importantly, the magnesium phosphate preferably is in salt compound form at the time or preformed before introduction into the process cheese mix, instead of in situ preparation thereof in the process cheese mix. This has been found to be important to provide a magnesium-fortified process cheese product having the desired texture and functionality. In one embodiment, the magnesium phosphate is provided as a precombination comprising a magnesium phosphate salt of a magnesium source and a phosphorus source. The magnesium phosphate salt may be selected from the group consisting of magnesium phosphate dibasic, magnesium phosphate tribasic, and mixtures thereof. The magnesium phosphate salt may comprise magnesium phosphate dibasic trihydrate, magnesium phosphate tribasic pentahydrate, or combinations thereof. The magnesium phosphate nutritional supplement may be combined with the cheese blend in amount effective to provide at least about 10% DV of magnesium per serving of the process cheese product. Also, the savory saltiness imparted by the magnesium phosphate supplement nutrient makes it possible to enhance flavors in the product or reduce sodium salt levels in the process cheese without loss of flavor.

While methods described herein may be preferably used to fortify processed cheeses of a variety of sizes, shapes, and weights, the disclosed methods may also be used with other food products, such as, but not limited to, other cheese and dairy products. Furthermore, it is also preferred to utilize the methods herein to fortify food products with magnesium, but the disclosed methods may likewise be used with other suitable vitamins, nutrients, minerals, antioxidants, probiotics, botanicals, colors, flavors, preservatives, anticaking agents, and mixtures thereof.

For purposes herein, the terms "serving", "% DV", and "DV" have meanings as respectively set forth for them under the provisions of 21 C.F.R. §101.9 (Apr. 1, 2005). A "unit" refers to an individual self-supporting food structure.

DESCRIPTION OF THE PREFERRED EMBODIMENTS

Figure 1:
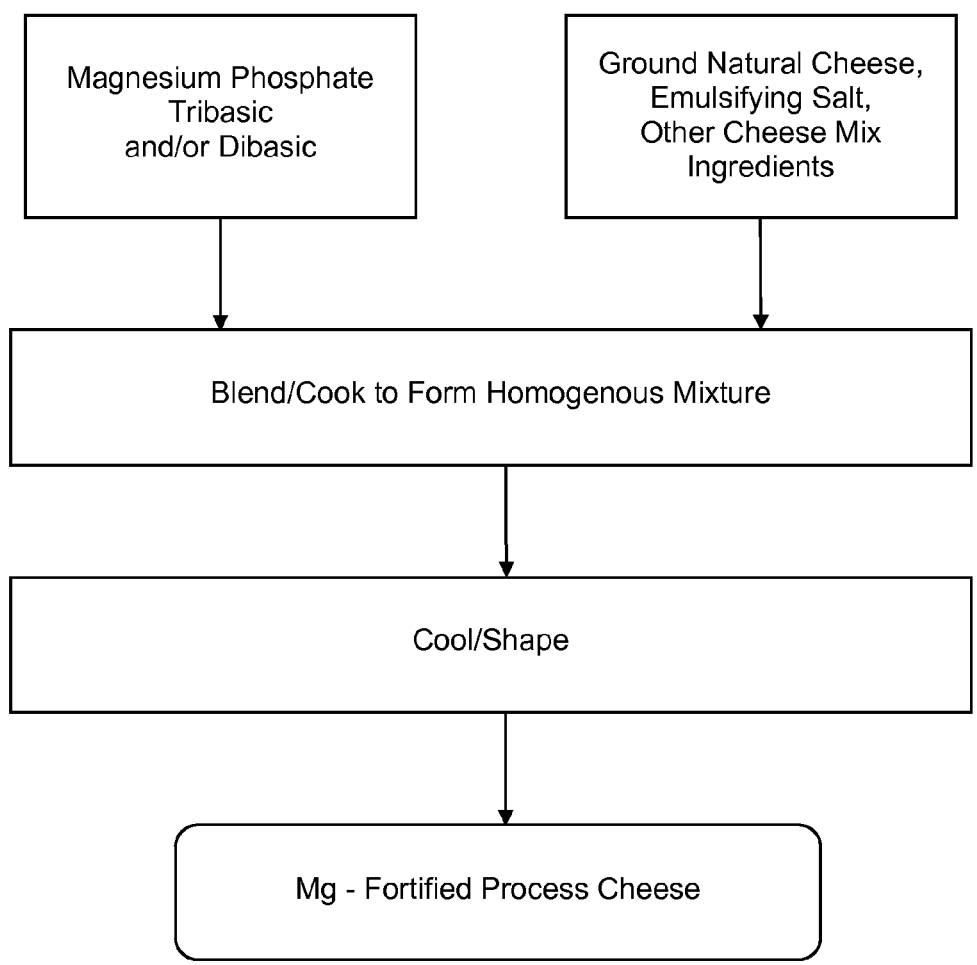
FIG. 1 is a process flow chart of a method for in-situ fortification of process cheese with magnesium in accordance with an embodiment of the present invention.

Referring to FIG. 1, a method of the present invention is provided for fortifying formulated or process cheese products with magnesium, in the form of magnesium phosphate at significant levels (e.g., at least 10% DV) without sacrificing functionality or the desired sensory properties of the product, such as desired flavor, texture and firmness. This method overcomes typical quality challenges encountered in adding the mineral magnesium into formulated or process cheese products.

Magnesium fortification can cause flavor, texture and shelf life problems. It was noted that other methods of magnesium fortification had unacceptable grainy or soft texture. These changes are likely as a result of undesirable pH change and ion exchange in the product. This is particularly an issue in processed cheese products since it is a pH sensitive product. It is thought that the emulsifier salts added during process cheese manufacture act as calcium-sequestering agents thus sodium or potassium phosphates and citrates are often used. The sodium or potassium exchange with calcium in the food matrix during heating. The described ion exchange prevents the insoluble calcium-protein association to precipitate out during heating since the calcium is associated with a phosphate or citrate and the sodium or potassium association with the protein keeps it soluble. This ion exchange is pH sensitive, shifting this protein and mineral reaction, which can result in undesired or unexpected texture changes. Further, when additional calcium or other divalent cations are added they may attract protein, aggravating a problem sought to be prevented with emulsifier salts, and creating a less desirable texture. Therefore, ideally, it is important to maintain the pH and limit the exchange of divalent cations during process cheese manufacture.

Further, this method also allows for nutritionally significant amounts of magnesium fortification in process cheese products with flavor enhancement properties, namely salt potentiation. Salty flavor is a key driver for process cheese acceptance by consumers. The added salty flavor contributed from magnesium addition allows further improvements in the nutrition quality of the product by reducing the total amount of sodium needed in the product for flavor reasons. Also, this salt flavoring enhancement may be used in lieu of conventional sodium salt substitutes, and particularly potassium salts, conventionally used for reduced-sodium salt flavoring systems in foods. Potassium salts often impart bitter flavors in the food product, unlike magnesium salts. Therefore, the salty flavor enhancement provided with the magnesium provides significant amounts of magnesium delivery per serving of process cheese, which can be used to either intensify the overall salty flavor or alternatively to replace sodium salt content such that the overall sodium content of product can be reduced without loss of salt flavoring.

The present invention significantly alleviates or eliminates the problems associated with magnesium fortification in process cheese manufacture. In addition, the present invention makes it possible to impart additional salt flavor in the process cheese via magnesium phosphate addition, and optional acid addition, without adversely impacting functionality and product texture, such that levels of sodium chloride in the process cheese product can be reduced while maintaining an overall desired amount of salt flavoring in the product. Although magnesium is the preferred fortifying mineral, the invention is also applicable to other divalent cation mineral fortifying agents for process cheese, such as calcium.

Magnesium Phosphate Fortifying Agent. Importantly, various forms of magnesium phosphate can be introduced in process cheese manufacture in salt form (i.e., a chemical compound form) or as a pre-combination of a magnesium source and a phosphorus source. Optionally, the components of magnesium phosphate can be obtained from other sources during production. For example the phosphorus can come from phosphoric acid or other mineral forms, such as sodium phosphate, potassium phosphate or calcium phosphate as long as they are pre-blended with a magnesium source in a manner effective to form magnesium phosphate before admixture with the other process cheese mix ingredients. It has been found that forming magnesium phosphate in situ during process cheese manufacture does not work since the product quality was inferior. This aspect of the invention is also relevant to other nutritional minerals, especially calcium, which may be added in addition to the magnesium phosphate.

Figure 2:
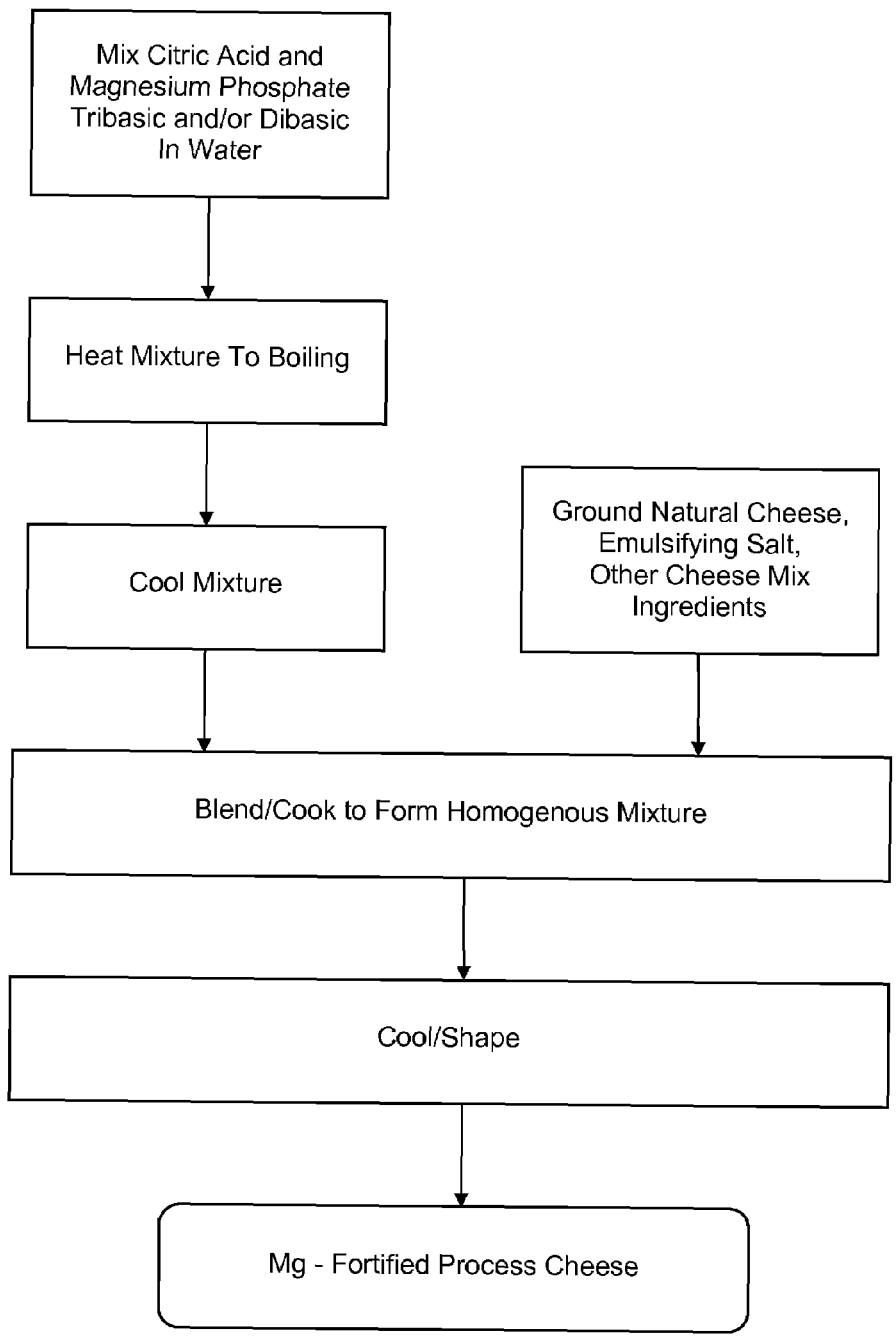
FIG. 2 is a process flow chart of a method for in-situ fortification of process cheese with magnesium in accordance with another embodiment of the present invention.

It has further been found that pH adjustment with typical components like lactic acid or citric acid may be critical in maintaining the process cheese product quality in some embodiments. One method is shown in FIG. 2, process cheese is made in a similar manner as in FIG. 1 except that the magnesium phosphate source is pretreated by mixing it with an organic acid, such as citric acid, in an aqueous solution and the resulting mixture is heated to boiling to encourage mixing and dissolution of the magnesium phosphate salt. The resulting mixture is allowed to cool to room temperature before it added to the process cheese formulation. The acidulant can alternatively be added separately during process cheese manufacture to reach the desired pH target.

Optionally, one can additionally fortify the product with other vitamins and minerals in addition to magnesium phosphate.

In one embodiment, the process cheese products are fortified with magnesium phosphate sufficient to provide between about 10 and 400 mg, particularly between about 20 and about 80 mg, magnesium per serving. In another embodiment, the process cheese products are fortified with magnesium phosphate sufficient to provide at least about 10% DV magnesium per serving, particularly between about 10% to about 100% DV magnesium per serving. Typically, a single serving of process cheese is about 19-21 g.

The source of the mineral magnesium that is added during manufacture of process cheese is a magnesium phosphate in salt form. Preferably, the magnesium phosphate is magnesium phosphate tribasic, magnesium phosphate dibasic, or a combination thereof. Magnesium phosphate tribasic and magnesium phosphate dibasic are commercially available as white, odorless, crystalline powders that are soluble in dilute acids, slightly soluble in water and insoluble in alcohol. The magnesium phosphate tribasic may be in the form of magnesium phosphate tribasic tetrahydrate, magnesium phosphate tribasic pentahydrate, magnesium phosphate tribasic octahydrate or magnesium phosphate tribasic anhydrous. The magnesium phosphate dibasic may be in the form of magnesium phosphate dibasic trihydrate. Magnesium phosphate tribasic particularly may be magnesium phosphate tribasic ($Mg_3(HPO_4)_2 \cdot 5H_2O$, CAS Reg. No. 7757-87-1). It may be produced as a precipitate from a solution of magnesite ($MgCO_3$) with phosphoric acid in accordance with a generally known method. Magnesium phosphate dibasic includes magnesium phosphate dibasic ($MgHPO_4 \cdot 3H_2O$, CAS Reg. No. 7782-75-4). The magnesium phosphate also is preformed from sources of magnesium and phosphate before addition to process cheese ingredients. A micronized particle can be used for the magnesium phosphate. The magnesium phosphate may, for example, have an average particle size (D50) of 5 microns or less. The particle size of other magnesium forms can also be micronized to 5 microns or less.

A combination of magnesium phosphate and other magnesium salts also may be used. For example, magnesium citrate, can be used in combination with magnesium phosphate tribasic or magnesium phosphate dibasic, and so forth.

It also will be appreciated that sea salt typically contains appreciable amounts of magnesium chloride, sodium chloride, potassium chloride, magnesium sulfate and magnesium oxide. Therefore, the synthesized magnesium phosphate materials represent a different class of magnesium salts than sea salt per se. Also, the synthesized magnesium phosphate delivers concentrated salt flavoring into the process cheese system while also making it possible to provide significant % DV magnesium without making the product overly salty.

Additional nutritional components. Processed cheese can also include additional nutritional additives. These may include one or more of calcium, phosphorus, zinc, iron, vitamin A, vitamin D, vitamin E, vitamin D, vitamin C, B vitamins, vitamin K and the like. Calcium is typically added in the form of calcium phosphate. It also can be introduced via a dairy ingredient of the process cheese composition. In addition, other calcium salts can be used. For example, calcium citrate is an option. The use of these calcium salts in combination is another option. Other calcium salts can also be used in combination with calcium phosphate, such as calcium lactate, calcium gluconate, calcium carbonate. The particle size of calcium salts such as calcium phosphate may be 30 microns or less. A micronized particle can be used for the calcium phosphate. The calcium salts may, for example, be 10 microns or less or have an median particle size (D50) of 5 microns or less. The particle size of other calcium forms can also be micronized to 5 microns or less. The calcium phosphate preferably does not have a particle size large enough to impart grittiness into the process cheese product. Use of micronized calcium has shown to be advantageous in process cheese, even without magnesium fortification. This was especially noticed when calcium phosphate was used to add calcium to the product. It was preferred to use a portion of micronized calcium phosphate to deliver added calcium in order to limit the use of regular-grade calcium phosphate to 1.7% or less in the product. The quality was improved by using micronized calcium phosphate.

Process for Making Mg-Fortified Process Cheese. Processed cheeses differ from natural cheeses, as process cheeses are cheese products manufactured by combining a natural cheese with other ingredients. Processed cheeses are produced by processing (e.g., grinding) natural cheese and then mixing the prepared natural cheese with emulsifying agents (e.g., emulsifying salts). Typically, the resulting mixture is heated and worked to produce a homogenous mass of processed cheese. Accordingly, a processed cheese is a natural cheese which has subsequently been processed.

More particularly, the ingredients of the process cheese are blended, heated, and agitated to form a uniform substantially homogeneous mixture, which is thereafter cooled and molded into desired process cheese product shapes and forms. Particularly, one or more natural cheeses of the same or different age and/or variety which have been ground or comminuted in a grinder, are blended in a suitable blender, for example a ribbon blender, to provide a uniformly mixed raw material. The blended raw material is introduced into a heating and mixing apparatus, i.e., a cooker. The magnesium phosphate, emulsifiers, and other additives are combined with the raw material in the blender and/or the cooker. The other additives may include, e.g., dairy products, water, acidulant, sodium chloride, preservatives, and other ingredients and condiments such as supplemental nutrients, spices, flavorings, edible inclusions, etc.

Blending and Cooking. The ground natural cheese, with or in the absence of the other ingredients, can blended in a suitable blender or blenders, for example a ribbon blender, to provide a uniformly mixed raw material. The blended raw material is then introduced into a cooker. Preferably, the magnesium salts and emulsifying salts are added before cooking. The cheese blend is cooked for a time and temperature sufficient to pasteurize the cheese, and form a homogenous, pumpable, fluid cheese material that may be formed into sheets, slices, or other desired forms. The cooker may be a batch or in-line continuous cooking system in accordance with systems known in the art. For example, the cooker may be a lay-down cooker having a screw in the cooker chamber, or a steam jacketed kettle equipped with a mechanical agitator. Live steam can be injected into the cooker. In a batch mode of operation, the molten mass is then intermittently discharged from the cooker for appropriate handling to form process cheese products.

As indicated, magnesium phosphate, emulsifiers, and other additives (when used), are introduced in the blender and/or the cooker, preferably prior to cooking, as separate ingredients or combined with other ingredients like water and/or dairy powders. The cheese blend material is heated in the cooker to a temperature of at least 150° F., usually about 160° F. to about 240° F., and is held at that temperature for some equivalent time-temperature thermal treatment, and depending in part upon the cheese blend material and the desired cheese product. The mixture of ingredients is heated and mixed until a substantially homogenous flowable mass is provided as an intermediate product material.

Forming Process. The homogenous mixture of ingredients described above is formed by packaging hot or cooled. If the food is packaged hot, it is allowed to cool after packaging.

The mixture of ingredients may be cooled and/or molded with any suitable cooling apparatus conventional in the art for cooling process cheese. For example, the process cheese may be cooled on a chill roll. Slices, loaves and other conventional shapes can be provided. The cooled process cheese may be packaged using conventional equipment and methods used for that purpose. Alternatively, the process cheese may be hot packaged and cooled.

As used herein, the term "process cheese product," or "processed cheese product," includes, but is not limited to, those products which are identified according to Federal Standards of Identity as process cheese, process blended cheese, process cheese food, and process cheese spread. These products have recognized and established differences in composition, principally fat and moisture content, and permissible additives. Imitation process cheeses and soy-cheese containing process cheeses are also included. However, all of these process cheese products are manufactured by a method which includes cooking a blend of cheese with certain additives including emulsifying salts and magnesium phosphate.

Other Ingredients—Emulsifying agents. Suitable emulsifiers include those that are well-known in process cheese formulations. For example, the emulsifier may include at least one of the following: inorganic salts including monosodium phosphate, disodium phosphate, dipotassium phosphate, trisodium phosphate, sodium metaphosphate, sodium acid pyrophosphate, tetra-sodium pyrophosphate, sodium aluminum phosphate, sodium citrate, potassium citrate, calcium citrate, sodium tartrate, and sodium potassium tartrate. In process cheese, these emulsifying agents act as calcium chelating agents. In certain preferred embodiments, the emulsifier is a phosphate or citrate emulsifying salt. Appropriate concentrations of emulsifiers depend on the particular formulation of process cheese and can be determined using methods well known in food science. Typical concentration ranges for emulsifiers in process cheese are suitable for the current invention. In certain preferred embodiments, the emulsifier is present at a concentration of between about 0 and about 5 percent, preferably between about 1 and about 3 percent.

Milk Fats. A wide variety of milk fats can be employed in the process of the invention, but are not required. These milk fats include cream, dried sweet cream, anhydrous milk fat, concentrated milk fat, and mixtures thereof. Such milk fats are commercially available from sources known by those of skill in the art, such as, for example, Kraft Foods, Inc. (Northfield, Ill.), Land O'Lakes (Tulare, Calif.), Dairy Gold (Kilmallock, Ireland), New Zealand Milk Products, Inc. (Victoria, Australia), and Dairy Farmers of America (Dairy Farmer Coop.). The milk fat employed in the process of the invention generally ranges from about 0 to about 38 percent of the total weight of the cheese product or process cheese base being produced, and preferably ranges from about 15 to about 36 percent. The milk fat provides a thin continuous phase into which powder particles become embedded and form a matrix. In order to obtain a good fat distribution within the mixture of ingredients used to form a solid matrix, the milk fat should be heated to a temperature ranging from about 80° F. to about 140° F. If the milk fat is heated too high, off flavors may result in the products. In addition, higher temperatures add to the heat load that needs to be removed during the cooling step of the process. If the milk fat is not heated enough, it will not melt and, thus, will not mix easily with the other ingredients.

Concentrated Milk Powders. A wide variety of concentrated powders derived from milk (hereinafter "concentrated milk powders") can be employed in the process of the invention. These concentrated milk powders include non-fat dry milk (NFDM), whey powders, whey protein, whey protein concentrates, casein, and milk protein powders or concentrates. Preferred milk protein powders are commercially available under tradenames ALAPRO 4850 (MPC85), ALA- PRO 4700 (MPC70), ALAPRO 4560 (MPC56), ALAPRO 4420 (MPC42), and ALAPRO 4424 from New Zealand Milk Products, Inc. (New Zealand), and MPC80, MPC56, and MPC42 from Murray Goulburn (Australia); mixtures can also be used if desired. These concentrated milk powders may also be prepared by conventional procedures known by those of skill in the art. The concentrated milk powders are generally characterized by the amount of milk protein that they contain. For example, MPC70 contains 70 percent of crude protein. The concentrated milk powders employed in the process of the invention generally range from about 0 to about 60 percent of the total weight of the cheese product or process cheese base being produced.

Acidulants. Any edible acid may be used in the process of the invention, and particularly may be an edible organic acid or acid former, such as lactic acid, citric acid, malic acid, tartaric acid, propionic acid, hydrochloric acid, phosphoric acid, acetic acid, gluconic acid-delta-lactone, and the like. Lactic acid and citric acid are particularly useful. The use of an acid is optional when, according to the method of the invention, process cheese bases are prepared, but may be critical when cheese products are prepared. In other words, for cheese products of this invention which are to be directly consumed (as opposed to being used to make other cheese product), an acid generally should be included in the formulation. The acid employed in the method of the invention generally ranges from about 0 to about 2.0 percent of the total weight of the cheese product being produced, and from about 0 to about 2.0 percent of the total weight of the process cheese base being produced. The preferred amount of acid used is what is necessary to reach the pH of 5.6-5.9. The preferred acids are lactic, citric, and gluconic acid delta lactone.

Sodium Chloride. Sodium chloride (table salt) usually is employed in the process of the invention. Fine grade (small particles) sodium chloride dissolve more rapidly during the mixing of ingredients, and thus are preferred. The sodium chloride employed generally ranges from about 0 to about 4.0 percent of the total weight of the cheese product or process cheese base being produced, However, the addition of magnesium phosphate makes it possible to reduce sodium chloride requirements in the process cheese in order to provide and maintain a desired amount of salt flavoring as the magnesium phosphate additive imparts salt flavoring to the process cheese product. It also makes it possible to reduce or eliminate the need to use potassium salts for reducing sodium levels in the process cheese product without loss of salt flavoring intensity.

Preservatives. Preservatives, such as sorbic acid, propionic acid, natamycin, and the like, may optionally be employed in the process of present invention to inhibit the growth of mold on the cheese product or process cheese base being produced. The preservatives employed in the process of the invention generally ranges from about 0 to about 0.2 percent of the total weight of the cheese product or process cheese base being produced, and preferably ranges from about 0.15 to about 0.18 percent, with about 0.18 percent being most preferred.

Moisture. The amount of water employed in the process of the invention generally ranges from about 30 to about 75 percent of the total weight of the cheese product or process cheese base being produced, and particularly ranges from about 30 to about 60 percent, inclusive of moisture introduced as steam.

Other Optional Ingredients. It is contemplated that a wide variety of colorants and natural or artificial flavors and other ingredients may, optionally, be employed in the process of the invention. Such ingredients include any edible substance which, either alone, or in combination with other ingredients, imparts a desirable taste, color, and/or other benefit to the cheese product or process cheese base being manufactured. For example, other nutrients, spices, herbs, seasonings, edible inclusions, cheese flavorings, etc., can be added. The other optional nutrients included, but are not limited to calcium, vitamin D, vitamin A, and phosphorus, and so forth.

Calcium used in the product can be a calcium salt typically used for fortification. It is preferred that the calcium be a calcium phosphate or calcium citrate or a combination of the two. The particle size of the calcium salt can be standard grade or a micronized grade. When micronized, the average particle size (D50) is usually 5 microns or less.

Sequesterants or chelators can optionally be used. Such components can include phosphates, EDTA, amino acids, organic acids and the like.

Hydrocolloids or other texturizing agents can optionally be added.

The amount and type of these ingredients that may be employed in the process of the invention depend upon the desired color, flavor, and texture of the final cheese product or process cheese base being produced.

The fat content of the cheese product or process cheese base generally ranges from about 0 to about 40 percent of the total weight of the cheese product or process cheese base, and preferably ranges from about 0 to about 35 percent.

The solids content generally ranges from about 30 to about 70 percent of the total weight of the cheese product or process cheese base being produced, and preferably ranges from about 40 to about 70 percent.

After the mixture of ingredients has been properly cooled, it is ready for consumption (if used as a cheese product) or grinding during the production of process cheese in a process cheese manufacturing plant (if used as a process cheese base).

The Examples that follow are intended to illustrate, and not to limit, the invention. All percentages used herein are by weight, unless otherwise indicated.

EXAMPLES

Example 1

Processed cheese products were prepared in a pilot plant using different forms of magnesium. A control product was prepared without a magnesium source but otherwise was made in a similar manner. The basic cheese mix formulation used in making these products was as follows: 47.5% ground Cheddar cheese, 2.3% dairy fat, 18.95% whey and milk protein, 26.13% water, 1.7% nutrients, 2.2% emulsifiers, 1% salt, 0.18% preservatives, and 0.04% color. The forms of magnesium tested included: magnesium hydroxide, magnesium carbonate, magnesium lactate, magnesium glycerophosphate, magnesium sulfate, magnesium citrate, magnesium chloride, magnesium phytate, magnesium gluconate, magnesium ascorbate, magnesium aspartate, magnesium oxide, and magnesium phosphate. The magnesium phosphate was tribasic and dibasic. The sample of processed cheese fortified using magnesium phosphate was representative of the present invention, while samples fortified with the other magnesium sources were comparison samples. The amount of magnesium added was enough to deliver 10% DV (40 mg) per serving of the process cheese product. A serving of the process cheese product weighed 21 g. The amount of magnesium source needed to meet this criterion varied for each magnesium form. The amounts of whey and milk protein and water were fluctuated in the cheese formulation to allow for the added magnesium ingredient. The process cheese product was made in the pilot plant using a lay-down cooker and packaged into single wrapped 21 g slices.

The process cheese samples were evaluated for flavor, texture and firmness by a panel of process cheese experts. The magnesium content and pH of each sample also were quantitatively analyzed. The magnesium phosphate-containing process cheese product tasted closest to the control, but did have a pH increase. The pH also increased for the comparison process cheese samples each containing one of magnesium hydroxide, magnesium glycerophosphate, magnesium sulfate, magnesium aspartate, magnesium ascorbate, magnesium citrate, magnesium carbonate, and magnesium oxide, which resulted in a significantly softer texture with graininess and chalkiness in the mouth. The samples fortified with magnesium lactate, magnesium chloride, magnesium gluconate, and magnesium phytate did not have a pH change, but texture issues, namely softness and graininess.

Comparative Example 1

Process cheese was prepared according to Example 1 with magnesium oxide as the magnesium source with the modification that lactic acid was added to reach pH 5.75. It was found in Example 1 that the magnesium oxide increased the pH. It was found in this experiment that the pH adjustment with lactic acid did not overcome the technical drawbacks observed for use of magnesium oxide. The final product was still soft and insufficiently firm.

Example 2

A low-fat processed cheese product was prepared with magnesium phosphate tribasic added in an amount sufficient to deliver 10% DV (40 mg) Mg per serving, and a control was separately prepared without the magnesium salt but otherwise in a similar manner. The product was prepared in the pilot plant by the same method as in Example 1. The basic cheese mix formulation used in making these products was as follows: 51% ground reduced-fat natural cheddar cheese 27% water, 12% whey and milk protein 3.5% flavors, 2.6% emulsifiers, 1.5% nutrients other than magnesium phosphate, 1% salt, 1% stabilizers, 0.15% preservatives, and 0.05% color. Based on evaluation by a panel of process cheese experts, the magnesium phosphate fortified process cheese product had no noticeable differences from the control in terms of flavor, texture and firmness.

Example 3

Starting with the same inventive cheese formula and process as described in Example 1 with magnesium phosphate tribasic added in an amount sufficient to deliver 10% DV (40 mg) Mg per serving, vitamin A (in the form of palmitate and carotene), thiamin, vitamin B12, riboflavin, vitamin B6, vitamin E, and vitamin K were additionally added at a level to deliver 10% DV for each nutrient per serving. 4 grams of protein was also provided per serving. The vitamins were analyzed to ensure their presence in the product after processing. Based on evaluation by a panel of process cheese experts, the product was tasted and no noticeable changes were noted as compared to an unfortified product (control) which omitted the nutrients but otherwise was made in a similar manner. Thus it is expected that fortification with any of the tested vitamins could be achieved alone or in any combination thereof.

Example 4

Low-fat processed cheese slices containing 51% reduced-fat natural cheddar cheese, 27% water, 11% whey and milk protein, 3.5% flavors, 2.6% emulsifiers, 2.1% nutrients, 1% sodium chloride salt, 1% stabilizers, 0.15% preservatives, and 0.05% color was made in a pilot scale plant using a lay-down cooker and packaged into single wrapped slices according to a similar processing and equipment scheme as used in Example 1. The nutrients included magnesium from magnesium phosphate tribasic, vitamin D and vitamin A, with each added prior to cooking in an amount sufficient to deliver 10% DV nutrient per serving. Calcium, in the form of calcium phosphate, was added to deliver 20% DV of the nutrient per serving. Based on evaluation by a panel of process cheese experts, the product was tasted and no noticeable changes were noted as compared to an unfortified product (control) which omitted the nutrients but otherwise was made in a similar manner.

Example 5

Process cheese was prepared according to Example 1, but a combination of magnesium phosphate tribasic and magnesium citrate was used to deliver the magnesium. Each was added to deliver 2/8, 3/7, 4/6, 5/5, and 6/4% DV from magnesium citrate and magnesium phosphate tribasic, respectively. The process cheese product was close to an unfortified control prepared in a similar manner but without the combination of magnesium phosphate tribasic and magnesium citrate, though the former was slightly more firm, salty and astringent. Further, the firmness increased with the higher levels of magnesium citrate.

Example 6

Process cheese was prepared according to Example 1 with magnesium phosphate tribasic (10% DV amt.) and added lactic acid. A control was made in a similar manner except without adding the magnesium phosphate and lactic acid. Lactic acid was added to reach pH 5.75 since it was found in Example 1 that magnesium phosphate increased the pH up to 6.1, even though the product otherwise was comparable to control. The final product was comparable to the unfortified control and had the same pH, 5.75. A blind evaluation by an expert panel was performed of this product as compared to a similar product made without the magnesium phosphate. A panel of expert judges found this fortified product to be comparable to the control, with slightly more saltiness flavor and slightly more firmness.

Example 7

Process cheese formulations according to Example 6 were made with a range of different acid sources comprising lactic acid, citric acid, malic acid, gluconic acid delta lactone, tartaric acid, propionic acid, hydrochloric acid, and acetic acid. As was observed, all these acids individually were able to lower the pH of the respective magnesium-fortified process cheeses. The process cheese formulations made with lactic, citric, malic, and gluconic acids delta lactone were found to be the preferred forms. These acids (i.e., lactic, citric, malic, and gluconic acids delta lactone) were then used in various combinations thereof in additional process cheese formulations in amounts sufficient for the cheese formulation to reach pH 5.75. The best combination observed, from standpoints of functionality, texture and flavor, was lactic and citric acid as used in approximately equal amounts, though other acid combinations thereof also performed well.

Example 8

Process cheese was made otherwise similar to Example 6 with the source of acid being citric acid, which was mixed with magnesium phosphate tribasic pentahydrate in sufficient water to allow for mixing of the materials. The mixture was then heated to boiling, and then allowed to cool to room temperature before it was added to the process cheese formulation.

Example 9

Process cheese formulations were prepared in accordance with Example 6 with magnesium phosphate tribasic added in an amount sufficient to deliver 10% DV (40 mg) Mg per serving in which the 1.7% nutrient content was calcium phosphate in one formulation, and approximately equal amounts of calcium phosphate in combination with calcium citrate in a separate formulation (with adjustments made for solids and moisture). Both magnesium/calcium fortified process cheese formulations had comparable functional and sensory properties as the formulation of Example 6. These results showed that magnesium phosphate fortification can be done in combination with calcium fortification. The calcium can be introduced by calcium phosphate or calcium citrate, or the like.

Example 10

In another example, process cheese formulations in accordance with Example 9 (1.7% calcium phosphate) were prepared in which the calcium phosphate particle size was varied from standard powder of 30 microns to micronized powders with 5 micron particles. In comparing the process cheese products obtained, it was observed that the smaller particle sized samples had less perceived chalkiness, powdery mouthfeel, and mouth drying.

Example 11

The control formulation of Example 1 was used as a base formulation in the preparation of additional process cheese batches which comprised: 10a) the base formulation per se which did not contain magnesium phosphate, 10b) a batch with magnesium phosphate tribasic (1.04% replacement of whey and milk protein), and 10c) and three additional batches which each contained magnesium phosphate tribasic (1.04% replacement of whey and milk protein) and also reduced amounts of sodium salt (0.95%, 0.90% and 0.85% sodium salt, respectively). When the added sodium salt level was reduced by 0.05%-0.15%, the process cheese products had a salty flavor than was more similar to the base formulation product than the magnesium phosphate fortified base formulation containing 1% sodium salt which had a more intense saltiness. The magnesium phosphate-fortified products each had an acceptable taste and were comparable to the base formulation product from texture standpoint.

It will be understood that various changes in the details, materials, and arrangements of formulations and ingredients, which have been herein described and illustrated in order to explain the nature of the invention may be made by those skilled in the art within the principle and scope of the invention as expressed in the appended claims.

What is claimed is:

1. A method of making a nutritionally fortified process cheese product comprising combining, as a mixture, an emulsified homogenous cheese composition and magnesium phosphate in an amount effective for forming a magnesium-fortified process cheese product.

2. The method of claim 1, wherein the magnesium phosphate is derived as a precombination of a magnesium source and a phosphorus source.

3. The method of claim 2, wherein the magnesium source is selected from the group consisting of magnesium hydroxide, magnesium carbonate, magnesium lactate, magnesium oxide, and magnesium citrate.

4. The method of claim 2, wherein the phosphorus source is selected from the group consisting of phosphoric acid, potassium phosphate, sodium phosphate, and calcium phosphate.

5. The method of claim 2, wherein the precombination comprises a magnesium phosphate salt of a magnesium source and a phosphorus source.

6. The method of claim 5, wherein the magnesium phosphate salt is selected from the group consisting of magnesium phosphate dibasic, magnesium phosphate tribasic, and mixtures thereof.

7. The method of claim 5, wherein the magnesium phosphate salt comprises magnesium phosphate dibasic trihydrate.

8. The method of claim 5, wherein the magnesium phosphate salt comprises magnesium phosphate tribasic pentahydrate.

9. The method of claim 1, wherein the magnesium phosphate is combined in the mixture with at least one other magnesium source.

10. The method of claim 9, wherein the at least one other magnesium source is selected from the group consisting of magnesium citrate, magnesium lactate, magnesium gluconate, magnesium chloride, magnesium aspartate, and magnesium carbonate, individually or in any combination thereof.

11. The method of claim 10, wherein magnesium phosphate and magnesium citrate are used in combination.

12. The method of claim 10, where the magnesium source is less than 30 microns in size.

13. The method of claim 2, where magnesium phosphate is combined with citric acid, gluconic acid delta lactone, or lactic acid to form a combination of magnesium phosphate and magnesium citrate, magnesium gluconate, or magnesium lactate respectively.

14. The method of claim 9, further comprising, prior to the combining of the magnesium phosphate with the emulsified homogenous cheese composition, the steps of mixing magnesium phosphate with citric acid in aqueous solution to form a mixture containing magnesium phosphate, heating the mixture containing magnesium phosphate to approximately boiling temperature, and cooling the mixture containing magnesium phosphate.

15. The method of claim 1, wherein the magnesium phosphate is combined with the cheese composition in an amount effective to provide at least about 10% DV of magnesium per serving of the process cheese product.

16. The method of claim 1, wherein the magnesium phosphate is combined with the cheese composition in an amount effective to provide at least about 40.0 mg of magnesium per 21 g serving.

17. The method of claim 1, further comprising adding an acidulant or buffer in an amount to the cheese composition effective to provide a pH between about 5.6 and about 5.9 in the process cheese product.

18. The method of claim 17, wherein the acidulant or buffer is selected from the group consisting of one or more of lactic acid, citric acid, malic acid, gluconic acid delta lactone, propionic acid, phosphoric acid, and tartaric acid.

19. The method of claim 1, wherein the mixture further contains an acidulant selected from at least one of lactic acid and citric acid in an amount effective to provide a pH between about 5.6 and about 5.9 in the process cheese product.

20. The method of claim 1, wherein the cheese composition further comprises nutritional components selected from at least one of the group consisting of vitamin D, vitamin A, B vitamins, vitamin C, vitamin E, vitamin K, calcium, copper, iron, phosphorus, potassium, and zinc.

21. The method of claim 1, where the cheese composition further contains calcium delivered via a dairy ingredient.

22. The method of claim 1, where the cheese composition further contains added calcium present as at least one calcium salt selected from the group consisting of calcium phosphate, calcium citrate, calcium carbonate, and calcium lactate.

23. The method of claim 20, where the cheese composition contains added calcium present as calcium phosphate and calcium citrate in combination.

24. The method of claim 20, wherein the calcium is 10 microns or less in size.

25. The method of claim 1, further comprising forming the mixture into process cheese slices.

26. The method of claim 1, further comprising adding magnesium phosphate to the mixture in an amount effective to increase the saltiness or cheese flavor.

27. The method of claim 1, further comprising adding magnesium phosphate to the mixture in an amount effective to maintain at least the same level of saltiness in the process cheese product in comparison to the process cheese product containing an increased amount of sodium salt in the absence of the magnesium phosphate.

28. The method of claim 1, further comprising adding magnesium phosphate to the mixture in an amount effective to reduce overall sodium content without reducing salt flavor.

29. A method of making a nutritionally-fortified process cheese product, comprising:
  combining magnesium phosphate with a cheese blend including an emulsifying agent to provide a cheese mixture;
  heating and mixing the cheese mixture effective to provide a substantially homogenous intermediate cheese material;
  forming the intermediate cheese material into process cheese product comprising one or more process cheese units containing at least about 10% DV magnesium per serving.

30. The method of claim 29, further comprising the addition of an acidulant or buffer to reach the pH of 5.6-5.9 wherein the acidulant or buffer is selected from the group consisting of one or more of lactic acid, citric acid, malic acid, gluconic acid delta lactone, propionic acid, phosphoric acid, and tartaric acid.

31. The method of claim 29, further comprising, prior to the combining of the magnesium phosphate with the cheese blend, the additional steps of mixing magnesium phosphate with citric acid in aqueous solution to form a mixture containing magnesium phosphate, heating the mixture containing magnesium phosphate to approximately boiling temperature, and cooling the mixture containing magnesium phosphate.

* * * * *